(12) United States Patent
Kuri et al.

(10) Patent No.: US 11,333,554 B2
(45) Date of Patent: May 17, 2022

(54) SPECTROMETRY METHOD AND SPECTROMETRY APPARATUS

(71) Applicant: SEIKO EPSON CORPORATION, Tokyo (JP)

(72) Inventors: Ryohei Kuri, Minowa-Machi (JP); Seiji Aiso, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 37 days.

(21) Appl. No.: 17/093,665

(22) Filed: Nov. 10, 2020

(65) Prior Publication Data

US 2021/0140821 A1 May 13, 2021

(30) Foreign Application Priority Data

Nov. 12, 2019 (JP) .............................. JP2019-204505

(51) Int. Cl.
| | |
|---|---|
| *G01J 3/51* | (2006.01) |
| *G01J 3/28* | (2006.01) |
| *G06T 7/90* | (2017.01) |
| *G06V 10/56* | (2022.01) |

(52) U.S. Cl.
CPC .............. *G01J 3/2823* (2013.01); *G01J 3/51* (2013.01); *G06T 7/90* (2017.01); *G06V 10/56* (2022.01); *G06T 2207/10036* (2013.01)

(58) Field of Classification Search
CPC . G01J 3/465; G01J 3/46; G01J 3/2823; G06T 7/90
See application file for complete search history.

(56) References Cited

U.S. PATENT DOCUMENTS

| | | | | |
|---|---|---|---|---|
| 6,657,746 | B1* | 12/2003 | Fuchigami | ............. G06K 15/02 358/1.9 |
| 10,089,754 | B2* | 10/2018 | Tomioka | ................... G06T 7/90 |
| 2012/0008839 | A1* | 1/2012 | Hirota | ................... G06T 7/0012 382/128 |

FOREIGN PATENT DOCUMENTS

| | | |
|---|---|---|
| JP | 2013170867 A | 9/2013 |
| JP | 2018004423 A | 1/2018 |

* cited by examiner

*Primary Examiner* — Maurice C Smith
(74) *Attorney, Agent, or Firm* — Yu Gang (57) ABSTRACT

A spectrometry method used by a spectrometry apparatus including a spectrometry section including a spectrometer and an imaging device that captures a spectroscopic image, a spectroscopic controller that controls the action of the spectrometer, and an image generator that generates the spectroscopic image, the method including generating the spectroscopic image, dividing the range of the spectroscopic image into a plurality of regions including at least a first region, determining a reference value of a color value, generating a first region spectrum based on the spectroscopic image of the first region, calculating first region tristimulus values based on the first region spectrum, calculating a first region color value based on the first region tristimulus values, and calculating a first region color difference that is the color difference between the first region color value and the reference value by using a color difference formula.

6 Claims, 4 Drawing Sheets

SPECTROMETRY METHOD AND SPECTROMETRY APPARATUS

The present application is based on, and claims priority from JP Application Serial Number 2019-204505, filed Nov. 12, 2019, the disclosure of which is hereby incorporated by reference herein in its entirety.

BACKGROUND

1. Technical Field

The present disclosure relates to a spectrometry method and a spectrometry apparatus.

2. Related Art

There is a known apparatus that captures light reflected off an imaging target to generate a spectroscopic image.

For example, JP-A-2013-170867 discloses a spectrometry apparatus including a telecentric optical system, a wavelength variable interference filter that extracts light having a predetermined wavelength from the light having passed through the telecentric optical system, a wavelength switcher, and a light receiver that receives the light having passed through the wavelength variable interference filter and the wavelength switcher. The wavelength variable interference filter includes an electrostatic actuator that changes the size of a gap in the wavelength variable interference filter to extract light having a desired wavelength based on the size of the gap. Voltage applied to the electrostatic actuator can be changed to change the peak wavelength of the light that passes through the wavelength variable interference filter. A spectroscopic image corresponding to a desired peak wavelength can thus be acquired.

The thus configured spectrometry apparatus can be used as a color evaluator based on a spectroscopic image. Color nonuniformity (color unevenness) is a color evaluation element. A color unevenness quantifying component is necessary to properly evaluate the color unevenness. Quantification of the color unevenness allows replacement of human sensory inspection with automatic inspection, for example, in product visual inspection.

However, the spectrometry apparatus in the related art, which includes no color unevenness quantifying component, cannot properly evaluate color unevenness.

SUMMARY

A spectrometry method according to an application example of the present disclosure is a spectrometry method used by a spectrometry apparatus including a spectrometry section including a spectrometer that spectrally separates reflected light reflected off an imaging target to select light having a predetermined wavelength and an imaging device that captures spectroscopic images based on light fluxes having a plurality of wavelengths selected by the spectrometer, a spectroscopic controller that controls an action of the spectrometer, and an image generator that generates the spectroscopic image, the method including a spectroscopic image generation step of generating the spectroscopic image, a range division step of dividing a range of the spectroscopic image into a plurality of regions including at least a first region, a reference value determination step of determining a reference value of a color value, a region spectrum generation step of generating a first region spectrum based on the spectroscopic image of the first region, a tristimulus value calculation step of calculating first region tristimulus values based on the first region spectrum, a color value calculation step of calculating a first region color value based on the first region tristimulus values, and a color difference calculation step of calculating a first region color difference that is a color difference between the first region color value and the reference value by using a color difference formula.

DESCRIPTION OF EXEMPLARY EMBODIMENTS

A spectrometry method and a spectrometry apparatus according to the present disclosure will be described below in detail based on an embodiment shown in the accompanying drawings.

1. Spectrometry Apparatus

A spectrometry apparatus according to an embodiment will first be described.

Figure 1:
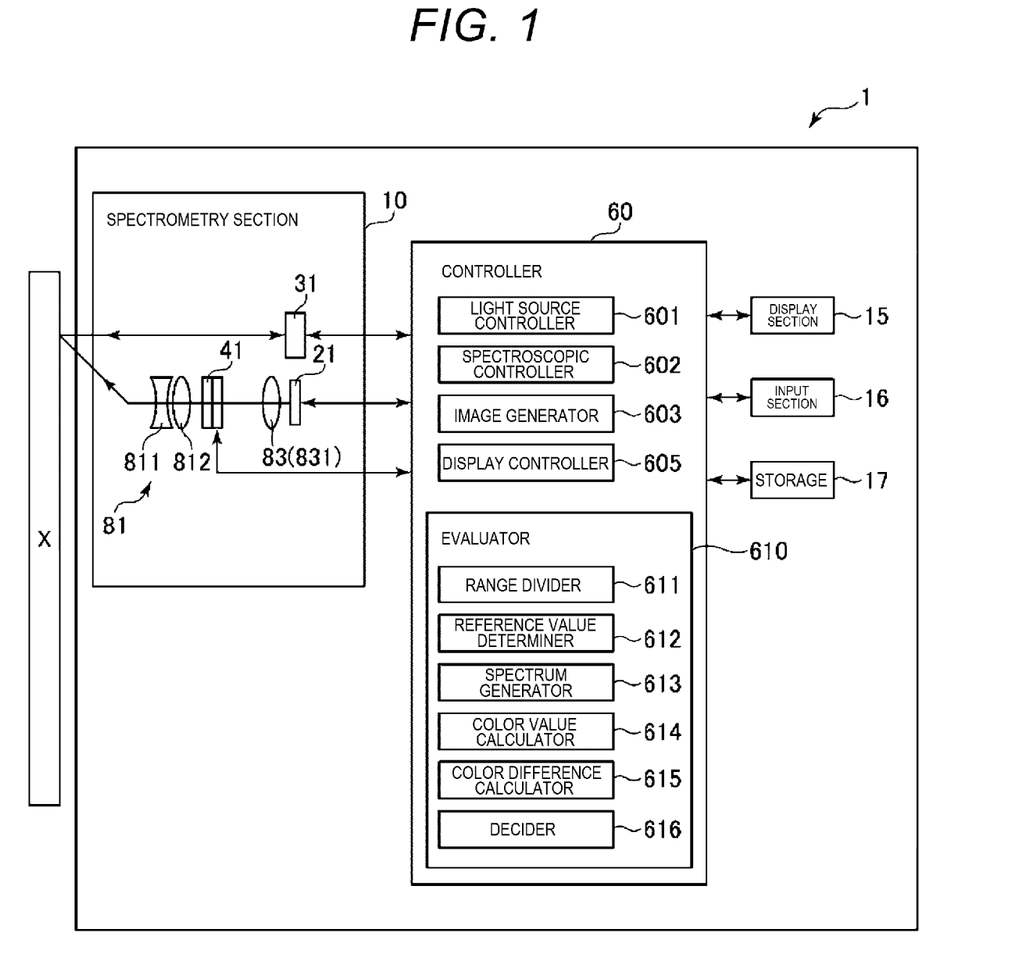
FIG. 1 is a functional block diagram showing a spectrometry apparatus according to an embodiment.
Figure 2:
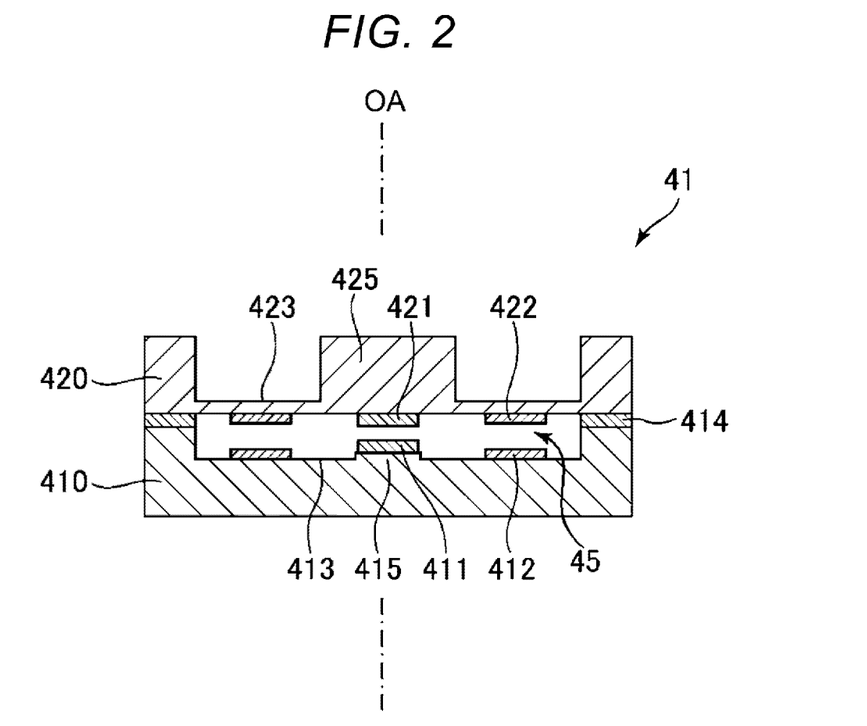
FIG. 2 is a cross-sectional view of a spectrometer shown in FIG. 1.

FIG. 1 is a functional block diagram showing the spectrometry apparatus according to the embodiment. FIG. 2 is a cross-sectional view of a spectrometer shown in FIG. 1.

The spectrometry apparatus 1 shown in FIG. 1 is also called a spectroscopic camera and is an apparatus that spectrally separates reflected light reflected off an imaging target X to acquire spectroscopic images based on light fluxes having a plurality of wavelengths and spectra determined from the spectroscopic images.

The spectrometry apparatus 1 includes a spectrometry section 10, a controller 60, a display section 15, an input section 16, and a storage 17. The portions described above will be sequentially described below.

1.1. Spectrometry Section

The spectrometry section 10 includes a light source 31, an imaging device 21, and a spectrometer 41.

The light source 31 is a device that radiates light to the imaging target X. The light radiated to and reflected off the imaging target X is incident as the reflected light on the imaging device 21 via the spectrometer 41, which will be described later. The light source 31 may be provided separately from the spectrometry apparatus 1.

Examples of the light source 31 may include a LED (light emitting diode) device, an organic EL (electro-luminescence) device, a xenon lamp, and a halogen lamp. The light source 31 is preferably a light source that outputs light having optical intensity across the entire wavelength range over which the spectrometer 41, which will be described later, can spectrally separates the light. Specifically, the light source 31 is preferably a light source capable of outputting white light having optical intensity across the entire visible light region. The light source 31 may instead be a device capable of radiating light that belongs to a wavelength range excluding that of white light, for example, light excluding visible light, such as infrared light.

The imaging device 21 is a device that captures the reflected light reflected off the imaging target X. The imaging device 21 is preferably a monochromatic imaging device because the spectrometer 41, which will be described later, selects light that belongs to a specific wavelength region out of the reflected light and the selected light is incident on the imaging device 21.

Examples of the imaging device 21 may include a CCD (charge coupled device) and a CMOS (complementary metal oxide semiconductor) device.

The spectrometer 41 is an optical element having the function of outputting (transmitting) the light that belongs to the specific wavelength region selectively out of the light incident on the spectrometer 41. The light outputted from the spectrometer 41 is incident on the imaging device 21.

The spectrometer 41 shown in FIG. 2 is a wavelength variable interference filter capable of changing the wavelength region of the light outputted from the spectrometer 41, that is, the specific wavelength region.

Examples of the wavelength variable interference filter may include a wavelength variable Fabry-Perot etalon filter, an acousto-optical tunable filter (AOTF), a linear variable filter (LVF), and a liquid crystal tunable filter (LCTF). Among them, the wavelength variable Fabry-Perot etalon filter is preferably used as the wavelength variable interference filter. In the wavelength variable Fabry-Perot etalon filter, an electrostatic actuator 45, which will be described later, or any other component can adjust the size of the gap between two filters (mirrors). The specific wavelength region can thus be changed.

The Fabry-Perot etalon filter uses multiple interference that occurs between the two filters to extract light that belongs to the specific wavelength region. The filters can each be thin, whereby the spectrometer 41 in the form of the Fabry-Perot etalon filter can be sufficiently thin. Specifically, the thickness of the spectrometer 41 can be set at a value smaller than or equal to 2.0 mm. Therefore, the size of the spectrometer 41 and in turn the size of the spectrometry apparatus 1 can be reduced.

FIG. 2 shows the spectrometer 41 in the form of a wavelength variable Fabry-Perot etalon filter as the wavelength variable interference filter.

The spectrometer 41 shown in FIG. 2 is a plate-shaped member that has an optical axis OA extending upward and downward in FIG. 2 and spreads in a direction that intersects the optical axis OA. The thus configured spectrometer 41 includes a fixed substrate 410, a movable substrate 420, a fixed reflection film 411, a movable reflection film 421, a fixed electrode 412, a movable electrode 422, and a bonding film 414. The fixed substrate 410 and the movable substrate 420 are integrally bonded to each other via the bonding film 414 with the fixed substrate 410 and the movable substrate 420 layered on each other.

The fixed substrate 410 has a reflection film placement section 415, which is located in a central portion of the fixed substrate 410, and a groove 413, which surrounds the reflection film placement section 415, in a plan view viewed from a position on the optical axis OA. The fixed substrate 410 is so configured that the portion corresponding to the reflection film placement section 415 has a length along the optical axis OA, that is, a thickness greater than the length along the optical axis OA, that is, the thickness of the portion corresponding to the groove 413. The fixed reflection film 411 is provided on a surface of the reflection film placement section 415 that is the surface facing the movable substrate 420. The fixed reflection film 411 functions as a fixed optical mirror that is one of the optical elements of the Fabry-Perot etalon filter.

The movable substrate 420 has a reflection film placement section 425, which is located in a central portion of the movable substrate 420, and a groove 423, which surrounds the reflection film placement section 425, in the plan view viewed from a position on the optical axis OA. The movable substrate 420 is so configured that the portion corresponding to the reflection film placement section 425 has a length along the optical axis OA, that is, a thickness greater than the length along the optical axis OA, that is, the thickness of the portion corresponding to the groove 423. The movable reflection film 421 is provided on a surface of the reflection film placement section 425 that is the surface facing the fixed substrate 410. The movable reflection film 421 functions as a movable optical mirror that is also one of the optical elements of the Fabry-Perot etalon filter.

The fixed electrode 412 is provided on a surface of the groove 413 provided in the fixed substrate 410 that is the surface facing the movable substrate 420. The movable electrode 422 is provided on a surface of the groove 423 provided in the movable substrate 420 that is the surface facing the fixed substrate 410. When voltage is applied to the gap between the fixed electrode 412 and the movable electrode 422, electrostatic attraction occurs and adjusts the size of the gap between the fixed reflection film 411 and the movable reflection film 421. The fixed electrode 412 and the movable electrode 422 form an electrostatic actuator 45. Since the movable electrode 422 is provided in the position corresponding to the groove 423, the movable reflection film 421 can be displaced by a large amount when the electrostatic attraction occurs.

The thickness of the fixed substrate 410 and the thickness of the movable substrate 420 are each preferably greater than or equal to about 0.1 mm but smaller than or equal to about 1.0 mm. The thus set thicknesses allow the thickness of the overall spectrometer 41 to be suppressed to a value smaller than or equal to 2.0 mm. The size of the spectrometry section 10 can thus be reduced.

The fixed reflection film 411 and the movable reflection film 421 are so disposed as to face each other via the gap. The fixed electrode 412 and the movable electrode 422 are also so disposed as to face each other via a gap. The fixed electrode 412 and the movable electrode 422 form the electrostatic actuator 45, which adjusts the size of the gap between the fixed reflection film 411 and the movable reflection film 421, as described above. Specifically, the electrostatic attraction produced when voltage is applied to the gap between the fixed electrode 412 and the movable electrode 422 flexes the movable substrate 420. As a result, the size of the gap, that is, the distance between the fixed reflection film 411 and the movable reflection film 421 can be changed. Setting the size of the gap as appropriate allows selection of a wavelength region of the light passing through the spectrometer 41 along the optical axis OA. That is, the specific wavelength region can be changed. Further, changing the configuration of the fixed reflection film 411 and the movable reflection film 421 allows control of the full width at half maximum of the spectrum of the light passing through the Fabry-Perot etalon filter, that is, the resolution of the Fabry-Perot etalon filter.

The fixed substrate 410 and the movable substrate 420 are each made, for example, of any of a variety of glass materials, such as soda glass, crystalline glass, quartz glass, lead glass, potassium glass, borosilicate glass, and alkali-free glass, or crystal quartz.

The bonding film 414 bonds the fixed substrate 410 to the movable substrate 420. The bonding film 414 is not limited to a specific film and may, for example, be a plasma polymerization film made primarily of siloxane.

The fixed reflection film 411 and the movable reflection film 421 are each formed, for example, of a metal film made, for example, of Ag or an Ag alloy, or a dielectric multilayer film including a high refraction layer and a low refraction layer.

The fixed electrode 412 and the movable electrode 422 are each made, for example, of any of a variety of electrically conductive materials.

The spectrometry section 10 shown in FIG. 1 further includes a spectrometer-side optical system 81 and an imaging-device-side optical system 83.

The spectrometer-side optical system 81 is disposed between the imaging target X and the spectrometer 41. The spectrometer-side optical system 81 shown in FIG. 1 includes a light incident lens 811 as a light incident optical system and a projection lens 812. The thus configured spectrometer-side optical system 81 guides the reflected light reflected off the imaging target X to the spectrometer 41.

The imaging-device-side optical system 83 is disposed between the spectrometer 41 and the imaging device 21. The imaging-device-side optical system 83 shown in FIG. 1 includes a light-incident/exiting lens 831. The thus configured imaging-device-side optical system 83 guides the outputted light outputted from the spectrometer 41 to the imaging device 21.

Providing the spectrometry section 10 with at least one of the spectrometer-side optical system 81 and the imaging-device-side optical system 83 allows an increase in a light collection capability of the imaging device 21 that is the ratio of the collected light to the reflected light reflected off the imaging target X.

At least one of the spectrometer-side optical system 81 and the imaging-device-side optical system 83 may be omitted in accordance with the light collection ratio of the imaging device 21.

The spectrometer-side optical system 81 may be disposed between the spectrometer 41 and the imaging-device-side optical system 83 in place of the position shown in FIG. 1.

The spectrometry section 10 has been described, but the position of the spectrometer 41 is not limited to the position shown in FIG. 1. Specifically, in the spectrometry section 10 shown in FIG. 1, the spectrometer 41 is disposed between the imaging target X and the imaging device 21, and the spectrometer 41 may instead be disposed between the imaging target X and the light source 31.

1.2. Display Section

The display section 15 displays an image that visualizes a spectroscopic image captured with the imaging device 21 and other arbitrary pieces of information.

The display section 15 is formed, for example, of a liquid crystal display device or an organic EL display device.

1.3. Input Section

The input section 16 accepts data necessary for the action of the controller 60 and inputted by a user of the spectrometry apparatus 1.

Examples of the input section 16 may include a touch panel, a slide pad, a keyboard, and a mouse. The input section 16 may be combined and integrated with the display section 15.

1.4. Storage

The storage 17 stores a variety of pieces of information, such as programs and data necessary for the actions of functional portions of the controller 60, data acquired by the spectrometry section 10, data necessary for display operation performed by the display section 15, and data inputted via the input section 16.

The storage 17 is a memory, such as a RAM (random access memory) and a ROM (read only memory).

1.5. Controller

The controller 60 shown in FIG. 1 includes a light source controller 601, a spectroscopic controller 602, an image generator 603, a display controller 605, and an evaluator 610. The actions of the functional portions described above are achieved by the combination of hardware components, such as a CPU (central processing unit) or any other processor, a memory, and an interface to an external component. For example, the controller 60 reads and executes the programs stored in the storage 17 to activate the functional portions and achieve the functions thereof.

The light source controller 601 controls turning on and off the light source 31, the wavelength, the intensity, and other factors of the outputted light, based, for example, on information inputted to the input section 16 and information stored in the storage 17.

The spectroscopic controller 602 acquires based on the information stored in the storage 17 drive voltage corresponding to the specific wavelength region of the light outputted from the spectrometer 41. The spectroscopic controller 602 then outputs a control signal for applying the acquired drive voltage to the electrostatic actuator 45 of the spectrometer 41. The spectroscopic controller 602 can thus control the action of the spectrometer 41 to control the specific wavelength region of the light outputted from the spectrometer 41.

The image generator 603 controls the operation of the spectrometry section 10 to cause the imaging device 21 to capture the light incident thereon via the spectrometer 41. The image generator 603 then generates a spectroscopic image based on captured image data provided from the imaging device 21. The image generator 603 causes the storage 17 to store the generated spectroscopic image. The spectroscopic image contains captured images at a plurality of wavelengths selected from the reflected light reflected off the imaging target X. The image generator 603 causes the storage 17 to also store the specific wavelength region used when the spectroscopic image is generated along with the spectroscopic image when storing the spectroscopic image in the storage 17.

The image generator 603 may cause the storage 17 to store a visualized image that visualizes the spectroscopic image along with the spectroscopic image or may cause the display section 15 to directly display the two images.

The display controller 605 causes the display section 15 to display, for example, the spectroscopic image and the variety of pieces of information in the form of a visualized image.

The evaluator 610 includes a range divider 611, a reference value determiner 612, a spectrum generator 613, a color value calculator 614, a color difference calculator 615, and a decider 616.

Although will be described later in detail, to evaluate color unevenness in a measurement target area of the imaging target X, the range divider 611 divides the measurement target area into a plurality of regions and identifies a plurality of regions that each serve as an evaluation target unit. Specifically, the range divider 611 accepts an input for dividing the measurement target area into a plurality of regions. For example, the range divider 611 causes the display section 15 to display the visualized image of the spectroscopic image via the display controller 605 and the input section 16 to accept input of information on the number of divided regions.

Although will be described in detail, to evaluate the color unevenness based on a calculated color difference, the reference value determiner 612 determines a reference value for determining the color difference.

The spectrum generator 613 generates the optical spectrum at each pixel from the spectroscopic image of the imaging target X and the specific wavelength region stored in the storage 17. The optical spectrum is the optical intensity distribution on a wavelength basis, and an optical spectrum on a pixel basis can be generated from the spectroscopic image. The spectrum generator 613 can therefore further calculate an "overall spectrum" that is an average optical spectrum of the overall measurement target area and a "region spectrum" that is the average optical spectrum of each of the regions generated by the range divider 611. In the present specification, the spectra described above are also called "spectroscopic information."

It is assumed in the present embodiment that the optical spectrum is a spectrum provided by measurement of the optical intensities in at least 4 wavelength bands. It is further preferable that the optical spectrum according to the present embodiment is a spectrum provided by measurement of the optical intensities in at least 16 wavelength bands.

The spectrum generator 613 may instead be configured to generate the spectroscopic information based on the information directly acquired from the image generator 603 without using the storage 17. The generated spectroscopic information is stored in the storage 17.

The color value calculator 614, although will be described later in detail, calculates three tristimulus values of each of the regions from the optical spectrum and further calculates a color value from the determined tristimulus values. The color value is a value representative of the color of the overall measurement target area or the color of each of the regions. The determined color value is stored in the storage 17 along with information indicating that the color value is representative of the overall measurement target area or each of the regions.

The color difference calculator 615 uses the color value of each of the regions determined by the color value calculator 614 to calculate the color difference between the color value and the reference value. The color difference serves as an index for quantification of the color unevenness in the measurement target area.

The decider 616 compares the color difference determined by the color difference calculator 615 with a threshold and decides whether or not the color difference falls within an acceptable range. The result of the decision is stored in the storage 17 and displayed on the display section 15 as required.

2. Spectrometry Method

A spectrometry method according to the embodiment will next be described.

Figure 3:
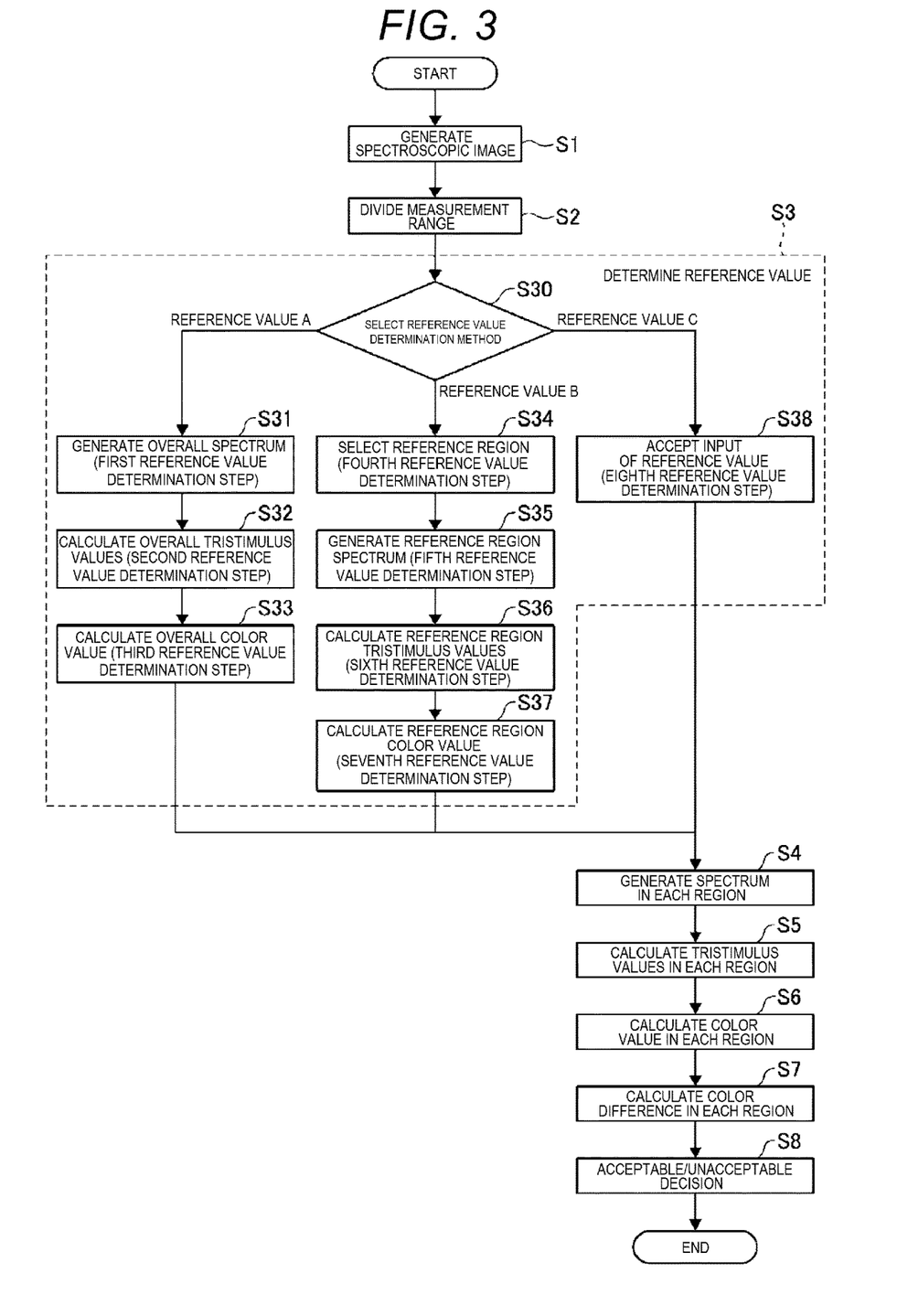
FIG. 3 is a flowchart showing a spectrometry method according to the embodiment.

FIG. 3 is a flowchart showing a spectrometry method according to the embodiment.

The spectrometry method shown in FIG. 3 includes a spectroscopic image generation step S1, a range division step S2, a reference value determination step S3, a region spectrum generation step S4, a tristimulus value calculation step S5, a color value calculation step S6, a color difference calculation step S7, and a decision step S8. The steps will be sequentially described below.

2.1. Spectroscopic Image Generation Step S1

The light source controller 601, the spectroscopic controller 602, and the image generator 603 first control the action of the spectrometry section 10 to generate a spectroscopic image. The image generator 603 then causes the storage 17 to store the generated spectroscopic image.

The spectrum generator 613 of the controller 60 then subsequently generates an optical spectrum from the spectroscopic image. The spectrum generator 613 then causes the storage 17 to store the optical spectrum, that is, the spectroscopic information.

2.2. Range Division Step S2

The measurement target area of the imaging target X, that is, a measurement range A00 of the spectroscopic image is then divided into a plurality of regions, specifically, a first region A01, a second region A02, . . . , a twelfth region A12. The division process can be carried out by the range divider 611. The range divider 611 reads the spectroscopic image stored in the storage 17 and acquires information on the number of divided regions, the division positions, and other factors for dividing the range of the spectroscopic image into a plurality of regions. The information may, for example, be information inputted by the user's input operation performed on the input section 17 or information stored in advance in the storage 17.

Figure 4:
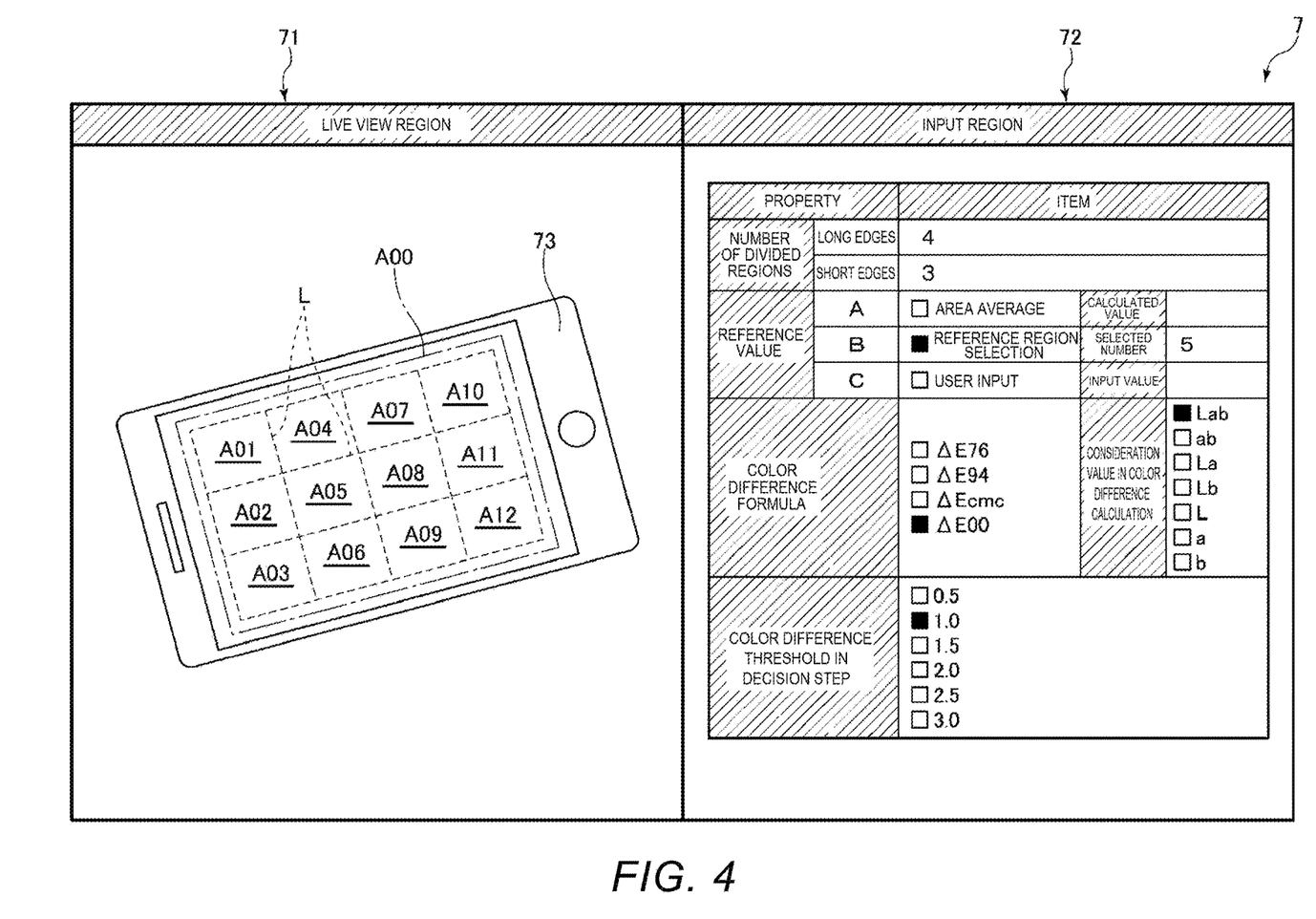
FIG. 4 shows an example of an operation screen displayed by a display section to carry out the spectrometry method shown in FIG. 3.

FIG. 4 shows an example of an operation screen displayed by the display section 15 to carry out the spectrometry method shown in FIG. 3. An operation screen 7 shown in FIG. 4 is a graphical user interface (GUI) that assists the user to input operation via the input section 16 based on the content displayed on the operation screen 7.

The operation screen 7 shown in FIG. 4 contains a live view region 71 and an input region 72.

The live view region 71 is a region where a visualized image that visualizes the spectroscopic image generated by the image generator 603 is displayed, for example, in a realtime manner. The live view region 71 may be configured to display a visualized image acquired by an imager provided separately from the spectrometry section 10.

The input region 72 is a region where information inputted via the input section 16 is displayed, for example, in the form of letters when the range division step S2 is carried out. The information inputted via the input section 16 is not only displayed in the input region 72 but so displayed as to be superimposed on the visualized image in the live view region 71. In the live view region 71, for example, a figure, a letter, and other objects are so displayed as to be superimposed on the visualized image. The information on the number of divided regions, the division positions, and other factors can thus be displayed not only in the form of letters but in the form of a figure and can assist the user's understanding.

In the example shown in FIG. 4, a visualized image of a smartphone 73 is displayed in the live view region 71. The measurement range A00 described above is set in a rectangular region corresponding to substantially the entire screen of the smartphone 73. The measurement range A00 is a target area where the color unevenness is measured and may be a range specified by the user or a range automatically specified by the controller 60 based on a condition stipulated in advance. In the latter case, for example, when the condition is so set that the screen of the smartphone 73 is specified, the range divider 611 of the controller 60 performs image processing on the visualized image to identify the measurement range A00.

Further, in the example shown in FIG. 4, the long edges of the measurement range A00 are divided into four segments, and the short edges of the measurement range A00 are divided into three segments. The measurement range A00 shown in FIG. 4 is thus divided into 12 regions, the first region A01 to the twelfth region A12. In this process, in the example shown in FIG. 4, lines L corresponding to the dividing lines are displayed in the live view region 71. The user can therefore visually grasp the division pattern. In the example shown in FIG. 4, letters that identify the first region A01 to the twelfth region A12 are also displayed in the live view region 71, but the displayed letters may be omitted.

The division pattern described above is created based on the information displayed in the input region 72. In the example shown in FIG. 4, the input region 72 shows that the number into which the long edges are each divided is 4 and the number into which the short edges are each divided is 3. The range divider 611 divides the measurement range A00 into regions, for example, at equal intervals based on the input information. The division interval may be nonequal intervals. The number of divided regions is not limited to a specific value and can be any value greater than or equal to 2.

2.3. Reference Value Determination Step S3

The reference value determination step S3 determines a reference value used to calculate the color difference in the color difference calculation step S7, which will be described later. The reference value is selected from a plurality of choices and determined by the user. The reference value determination step S3 according to the present embodiment therefore includes a determination method selection step S30 of accepting choices of a reference value determination method. The determination method is, however, not limited to the method described above. For example, the reference value determiner 612 may automatically select the reference value determination method in accordance with a preset condition.

The choices may, for example, be the following three values, reference values A to C. The determination method selection step S30 accepts input in such a way that one of the reference values A to C is selected.

In the example shown in FIG. 4, any of the reference values A to C can be selected via the corresponding radio button in the input section 72, and a reference value determination method is selected based on the result of the input operation. The choices will be sequentially described below.

2.3.1. Reference Value A (Area Average)

The reference value A is a value determined from the average of optical spectra across the entire measurement target area and is determined through the following three steps. That is, the reference value determination step S3 of determining the reference value A includes a first reference value determination step S31, a second reference value determination step S32, and a third reference value determination step S33.

In the first reference value determination step S31, the spectrum generator 613 first reads the spectroscopic image stored in the storage 17. The spectrum generator 613 then calculates as the "overall spectrum" the average of the optical spectra across the entire measurement range A00 of the spectroscopic image. Specifically, the spectrum generator 613 calculates the average of optical intensities on a wavelength basis at each pixel in the measurement range A00. The "overall spectrum" that is the distribution of the average optical intensity on a wavelength basis is thus determined for the measurement range A00. The calculation method described above is presented by way of example, and another method may be used to determine the average of the optical intensities.

In the second reference value determination step S32, the color value calculator 614 calculates "overall tristimulus values" based on the overall spectrum. The overall tristimulus values are tristimulus values representative of the entire measurement range A00 and average tristimulus values (XYZ values) across the entire measurement range A00 and determined from the overall spectrum, for example, by a predetermined colorimetry method.

A known colorimetry method is used to determine the XYZ values from the overall spectrum. As an example, the X value, the Y value, and the Z value are determined by integrating the overall spectrum multiplied by a color matching function over the entire wavelength range. The thus determined XYZ values are called "overall XYZ values."

In the third reference value determination step S33, the color value calculator 614 determines an average color value of the entire measurement range A00 based on the overall XYZ values. The color value determined from the overall XYZ values is called an "overall color value."

A method for calculating the overall color value may, for example, be a method for calculating the overall color value from the overall XYZ values based on the stipulation of a predetermined color space. Examples of the predetermined color space may include the L*a*b* color system, the LCH color system, the Munsell color system, and the Yxy color system. Among them, the L*a*b* color system or the Yxy color system is preferably used, and the L*a*b* color system is more preferably used from the viewpoint of easiness of calculation of the color difference in the color difference calculation step S7, which will be described later. That is, the overall color value is preferably formed of L*a*b* values or Yxy values. Further, the overall color value is more preferably formed of Yxy values when a liquid crystal panel, an LED, or any other light emitting object is an inspection target, and the overall color value is more preferably formed of L*a*b* values when a printed object, fabric, or any other non-light-emitting object is an inspection target.

The overall color value is determined as described above. The reference value determiner 612 uses the overall color value as the reference value A.

2.3.2. Reference Value B (Reference Region Selection)

The reference value B is a value determined from the average of optical spectra in a reference region that is part of the measurement target area and is determined through the following four steps. That is, the reference value determination step S3 of determining the reference value B includes a fourth reference value determination step S34, a fifth reference value determination step S35, a sixth reference value determination step S36, and a seventh reference value determination step S37.

The fourth reference value determination step S34 first selects a "reference region" for determining the reference value B. The reference region is one of the first area A01 to the twelfth region A12 generated in the range division step S2 described above. The user selects the reference region via the input section 16. The reference value determiner 612 accepts information that identifies the inputted reference region. The example shown in FIG. 4 shows that the fifth region A05 is identified as the reference region.

In the fifth reference value determination step S35, the spectrum generator 613 calculates the average of the optical spectra in the reference region as a "reference region spectrum." Specifically, the average of the optical intensities on a wavelength basis is calculated at each pixel in the reference region. A "reference region spectrum" that is the distribution of the average optical intensity on a wavelength basis is thus determined for the reference region. The calculation method described above is presented by way of example, and another method may be used to determine the average of the optical intensities.

In the sixth reference value determination step S36, the color value calculator 614 calculates "reference region tristimulus values" based on the reference region spectrum. The reference region tristimulus values are tristimulus values representative of the reference region and average tristimulus values (XYZ values) in the reference region and determined from the reference region spectrum, for example, by a predetermined colorimetry method.

A known colorimetry method is used to determine the XYZ values from the reference region spectrum. As an example, the X value, the Y value, and the Z value are determined by integrating the reference region spectrum multiplied by a color matching function over the entire wavelength range. The thus determined XYZ values are called "reference region tristimulus values."

In the seventh reference value determination step S37, the color value calculator 614 determines the average of the color values in the reference region based on the reference region tristimulus values. In the description, the color value determined from the reference region tristimulus values is called a "reference region color value."

A method for calculating the reference region color value may, for example, be a method for calculating the reference region color value from the reference region tristimulus values based on the stipulation of a predetermined color space. Examples of the predetermined color space may include the L*a*b* color system, the LCH color system, the Munsell color system, and the Yxy color system. Among them, the L*a*b* color system or the Yxy color system is preferably used, and the L*a*b* color system is more preferably used from the viewpoint of easiness of calculation of the color difference in the color difference calculation step S7, which will be described later. That is, the reference region color value is preferably formed of L*a*b* values or Yxy values. Further, the reference region color value is more preferably formed of Yxy values when a liquid crystal panel, an LED, or any other light emitting object is an inspection target, and the reference region color value is more preferably formed of L*a*b* values when a printed object, fabric, or any other non-light-emitting object is an inspection target.

The reference region color value is determined as described above. The reference value determiner 612 uses the reference region color value as the reference value B. The example shown in FIG. 4 shows the operation screen 7 when the reference region color value is formed of L*a*b* values.

2.3.3. Reference Value C (User Input)

The reference value C is a value inputted by the user via the input section 16 and is determined through the following one step. That is, the reference value determination step S3 that determines the reference value C includes an eighth reference value determination step S38.

The eighth reference value determination step S38 accepts the user's input operation via the input section 16. The reference value determiner 612 acquires the reference value C based on the inputted information.

Also in the case of the reference value C, the color system is not limited to a specific color system, and L*a*b* values or Yxy values are preferably used, more preferably L*a*b* values, as in the cases of the reference values A and B.

The reference values A to C have been described above. The reference value determined in the reference value determination step S3 is not limited to any of the reference values described above and may be any other reference value.

2.4. Region Spectrum Generation Step S4

The spectrum generator 613 then generates a first region spectrum to a twelfth region spectrum based on the spectroscopic information in the first region A01 to the twelfth region A12. The first region spectrum to a twelfth region spectrum are each calculated by using the above-mentioned method for calculating the reference region spectrum.

For example, to generate the first region spectrum, the average of the optical intensities at the pixels in the first region A01 on a wavelength basis is calculated. The "first region spectrum" is thus determined for the first region A01.

2.5. Tristimulus Value Calculation Step S5

The color value calculator 614 then calculates "first region tristimulus values to twelfth region tristimulus values" based on the first region spectrum to the twelfth region spectrum. The first region tristimulus values to the twelfth region tristimulus values are tristimulus values representative of the first region A01 to the twelfth region A12 and, for example, average tristimulus values (XYZ values) in the first region A01 to the twelfth region A12 calculated by using the above-mentioned method for calculating the reference region tristimulus values.

For example, the first region tristimulus values are determined from the first region spectrum by using a predetermined colorimetry method. As an example, the X value, the Y value, and the Z value are determined by integrating the first region spectrum multiplied by a color matching function over the entire wavelength range. The thus determined XYZ values are called "first region tristimulus values."

2.6. Color Value Calculation Step S6

The color value calculator 614 then determines average color values for the first region A01 to the twelfth region A12 based on the first region tristimulus values to the twelfth region tristimulus values. The color values determined from the first region tristimulus values to the twelfth region tristimulus values are called in the description "a first region color value to a twelfth region color value." The first region color value to a twelfth region color value are each calculated by using the above-mentioned method for calculating the reference region color value.

For example, the first region color value is calculated from the first region tristimulus values based on the stipulation of a predetermined color space. Examples of the predetermined color space may include the L*a*b* color system, the LCH color system, the Munsell color system, and the Yxy color system. Among them, the L*a*b* color system or the Yxy color system is preferably used, and the L*a*b* color system is more preferably used from the viewpoint of easiness of calculation of the color difference in the color difference calculation step S7, which will be described later. That is, the first region color value is preferably formed of L*a*b* values or Yxy values. Further, the first region color value is more preferably formed of Yxy values when a liquid crystal panel, an LED, or any other light emitting object is an inspection target, and the first region color value is more preferably formed of L*a*b* values when a printed object, fabric, or any other non-light-emitting object is an inspection target.

2.7. Color Difference Calculation Step S7

The color difference calculator 615 calculates "a first region color difference to a twelfth region color difference" based on the reference value determined in the reference value determination step S3 described above and the first region color value to the twelfth region color value calculated in the color value calculation step S6, that is, the first region color difference to the twelfth region color difference are color differences between the reference value and the color values in the first region A01 to the twelfth region A12. The first region color difference to the twelfth region color difference are quantified differences between the color values of the first region A01 to the twelfth region A12 and the reference color value, that is, quantified color unevenness. Evaluating the color unevenness in the measurement target area based on the quantified color unevenness allows appropriate evaluation of the color unevenness.

The method for calculating the color difference is not limited to a specific method and may be a method using a known color difference formula. Examples of the color difference formula may include the CIE76 color difference formula (ΔE76), the CIE94 color difference formula (ΔE94), the CMC color difference formula (ΔEcmc), and the CIE DE2000 color difference formula (ΔE00).

In the example shown in FIG. 4, a color difference formula can be selected via the corresponding radio button in the input region 72, and the color difference calculator 615 selects a color difference formula based on the result of the input and uses the selected color difference formula to calculate the color difference. The example shown in FIG. 4 shows that ΔE00 is selected.

The color difference calculator 615 can reflect a "consideration value" inputted by the user in the calculation of the color difference.

In the example shown in FIG. 4, seven choices, Lab, ab, La, Lb, L, a, and b, are listed as the consideration value used when the color difference is calculated. The user can select any of the choices via the corresponding radio button in the input region 72.

To calculate the color difference in the L*a*b* color system when the choice "Lab" is selected from the choices, the color difference calculator 615 calculates the color difference between the first region color value to the twelfth region color value and the reference value in consideration of all the L* value, the a* value, and the b* value.

When the choice "ab" is selected, the color difference calculator 615 calculates the color difference in consideration only of the a* value and the b* value. Similarly, when the choice "La" is selected, the color difference calculator 615 calculates the color difference in consideration only of the L* value and the a* value, and when the choice "Lb" is selected, the color difference calculator 615 calculates the color difference in consideration only of the L* value and the b* value.

Further, when the choice "L" is selected, the color difference calculator 615 calculates the color difference in consideration only of the L* value. Similarly, when the choice "a" is selected, the color difference calculator 615 calculates the color difference in consideration only of the a* value, and when the choice "b" is selected, the color difference calculator 615 calculates the color difference in consideration only of the b* value.

The thus quantified color unevenness is further used in evaluation using another method. The method for evaluating the color unevenness is not limited to a specific method, and a variety of other methods are conceivable. In the present embodiment, the evaluation is performed in the following decision step S8.

The above description has been made of the case where the color values and the reference value are those in the L*a*b* color system. When the L*a*b* color system is replaced, for example, with the Yxy color system, the consideration value described above may, for example, be "Yxy" or "xy." When the former is selected, the color difference calculation in the Yxy color system is performed in consideration of all the Y value, the x value, and the y value, and when the latter is selected, the color difference calculation is performed in consideration only of the x value and the y value.

2.8. Decision Step S8

In the decision step S8, the decider 616 compares the first region color difference to the twelfth region color difference with a threshold. The decider 616 then performs acceptable/unacceptable decision of whether or not the color unevenness in each of the first region A01 to the twelfth region A12 falls within an acceptable range.

The threshold is a maximum acceptable color difference and is inputted, for example, by the user via the input section 16. The inputted threshold is displayed in the input region 72, as shown in FIG. 4. In the example shown in FIG. 4, a "color difference threshold" is selectable via the corresponding radio button in the input region 72, and the decider 616 selects a color difference threshold based on the result of the input and uses the selected color difference threshold in the acceptable/unacceptable decision of the color unevenness. The example shown in FIG. 4 shows that "1.0" is selected as the color difference threshold. In this case, the region corresponding to a color difference smaller than or equal to 1.0 out of the first region color difference to the twelfth region color difference is decided as an "acceptable region (OK region)." On the other hand, the region corresponding to a color difference greater than 1.0 out of the first region color difference to the twelfth region color difference is decided as an "unacceptable region (NG region)." In the present embodiment, the "color difference threshold" is selected via the corresponding radio button in the input region 72, but not necessarily, and an arbitrary numeral may be inputted to the "color difference threshold."

The result of the decision is stored in the storage 17 and displayed on the display section 15 as required.

As described above, the spectrometry method according to the present embodiment is a method used by the spectrometry apparatus 1 including the spectrometry section 10, the spectroscopic controller 602, and the image generator 603. The spectrometry section 10 includes the spectrometer 41, which spectrally separates the reflected light reflected off the imaging target X to select light having a predetermined wavelength, and the imaging device 21, which captures spectroscopic images based on light fluxes having a plurality of wavelengths selected by the spectrometer 41. The spectroscopic controller 602 controls the action of the spectrometer 41. The image generator 603 generates a spectroscopic image.

The spectrometry method according to the present embodiment includes the spectroscopic image generation step S1, the range division step S2, the reference value determination step S3, the region spectrum generation step S4, the tristimulus value calculation step S5, the color value calculation step S6, and the color difference calculation step S7. The spectroscopic image generation step S1 is the step of generating a spectroscopic image. The range division step S2 is the step of dividing the range of the spectroscopic image (measurement range A00) into a plurality of regions (first region A01 to the twelfth region A12) including at least the first region A01. The reference value determination step S3 is the step of determining a reference value of a color value. The region spectrum generation step S4 is the step of generating the first region spectrum to the twelfth region spectrum based on the spectroscopic images of the first region A01 to the twelfth region A12. The tristimulus value calculation step S5 is the step of calculating the first region tristimulus values to the twelfth region tristimulus values based on the first region spectrum to the twelfth region spectrum. The color value calculation step S6 is the step of calculating the first region color value to the twelfth region color value based on the first region tristimulus values to the twelfth region tristimulus values. The color difference calculation step S7 is the step of calculating the first region color difference to the twelfth region color difference, which are the color differences between the first region color value to the twelfth region color value and the reference value, by using a color difference formula.

The spectrometry method described above, which can determine the color difference between a measured color value and the reference value, can quantify the color unevenness in the measurement target area of the imaging target X. Using the spectrometry apparatus 1 capable of carrying out the spectrometry method described above readily allows replacement of human sensory inspection with automatic inspection, for example, in product visual inspection.

In the spectrometry method described above, optical spectra are generated, and the color difference is calculated based on the generated optical spectra. On the other hand, related-art cameras called an RGB camera and an XYZ camera each measure optical intensities in three wavelength bands. Specifically, the RGB camera is a camera capable of measuring the optical intensities based on the three primary colors of light, and the XYZ camera is a camera that reflects tristimulus values, which are human perceptive sensitivities. A color value measured with either of the cameras described above is therefore strongly affected by the color of illumination light and is hence unsuitable for strict measurement. An accurate color difference cannot therefore be calculated, and it is hence difficult to quantify the color unevenness. In contrast, the spectrometry method described above measures optical intensities in a large number of wavelength bands and generates optical spectra to calculate the color difference, whereby a measured color value is unlikely to be affected by illumination light. A more accurate color difference can thus be calculated.

The spectrometry method according to the present embodiment further includes the decision step S8 of performing acceptable/unacceptable decision by comparing the first region color difference to the twelfth region color difference with a threshold, as described above.

The configuration described above can automatically perform color unevenness acceptable/unacceptable decision, which is difficult to automatically perform in related art. The configuration therefore allows replacement of human sensory inspection with automatic inspection, for example, in product visual inspection.

Further, in the spectrometry method according to the present embodiment, the first region color value to the twelfth region color value and the reference value are preferably color values in the L*a*b* color system. In the L*a*b* color system, a uniform color space for color display is defined in a three-dimensional orthogonal coordinate system. A color value in the L*a*b* color system therefore has an advantage of relatively easy calculation because a color difference can be calculated based on the Euclidean spatial distance.

The above-mentioned reference value determination step S3 that determines the reference value A includes the first reference value determination step S31, which generates the overall spectrum across the overall range (measurement range A00) of a spectroscopic image, the second reference value determination step S32, which calculates the overall tristimulus values based on the overall spectrum, and the third reference value determination step S33, which calculates the overall color value based on the overall tristimulus values and uses the overall color value as the reference value A.

According to the configuration described above, a reference value in consideration of the entire measurement range A00 can be determined, and the color unevenness in each of the first region A01 to the twelfth region A12 can be quantified based on the reference value. As a result, for example, acceptable/inacceptable decision can be made across the measurement range A00 from the viewpoint of whether or not the color unevenness is noticeable.

Further, in the color difference calculation step S7 described above, one of a plurality of color difference formulae is selected, and the first region color difference to the twelfth region color difference are calculated based on the selected color difference formula.

According to the configuration described above, the color difference formula can be changed in accordance, for example, with the purpose of the color unevenness quantification. The color unevenness can thus be quantified in more accordance with a purpose.

The spectrometry apparatus 1 according to the present embodiment includes the spectrometry section 10, the spectroscopic controller 602, the image generator 603, the range divider 611, the reference value determiner 612, the spectrum generator 613, the color value calculator 614, and the color difference calculator 615, as described above. The spectrometry section 10 includes the spectrometer 41, which spectrally separates the reflected light reflected off the imaging target X to select light having a predetermined wavelength, and the imaging device 21, which captures a spectroscopic images based on light fluxes having a plurality of wavelengths selected by the spectrometer 41.

The spectroscopic controller 602 controls the action of the spectrometer 41. The image generator 603 generates a spectroscopic image. The range divider 611 divides the range of the spectroscopic image (measurement range A00) into a plurality of regions (first region A01 to the twelfth region A12) including at least the first region A01. The reference value determiner 612 determines a reference value of a color value for determining a color difference. The spectrum generator 613 generates the first region spectrum to the twelfth region spectrum based on the spectroscopic images of the first region A01 to the twelfth region A12. The color value calculator 614 calculates the first region tristimulus values to the twelfth region tristimulus values based on the first region spectrum to the twelfth region spectrum and calculates the first region color value to the twelfth region color value based on the first region tristimulus values to the twelfth region tristimulus values. The color difference calculator 615 calculates the first region color difference to the twelfth region color difference, which are the color differences between the first region color value to the twelfth region color value and the reference value, by using a color difference formula.

The configuration described above, which allows determination of the color difference between a measured color value and the reference value, allows quantification of the color unevenness in the measurement target area of the imaging target X. Using the spectrometry apparatus 1 capable of carrying out the spectrometry method described above readily allows replacement of human sensory inspection with automatic inspection, for example, in product visual inspection.

In the spectrometry apparatus 1, optical spectra are generated, and the color difference is calculated based on the generated optical spectra. That is, the spectrometry apparatus 1 measures optical intensities in a large number of wavelength bands and generates optical spectra to calculate the color difference. A measured color value is therefore unlikely to be affected by illumination light. As a result, a more accurate color difference can be calculated.

The spectrometry method and the spectrometry apparatus according to the present disclosure have been described above based on the embodiment shown in the drawings, but the spectrometry apparatus according to the present disclosure is not limited to the spectrometry apparatus according to the embodiment described above, and the configuration of each portion of the spectrometry apparatus can be replaced with a portion having an arbitrary configuration having the same function. Further, another arbitrarily constituent part may be added to the spectrometry apparatus according to the embodiment described above.

Further, in the spectrometry method according to the present disclosure, a step for an arbitrary purpose may be added to the embodiment described above.

The spectrometry apparatus according to the present disclosure is incorporated for use, for example, in a smartphone, a tablet terminal, a personal computer, a digital camera, a video camcorder, a wearable terminal, a drone, a drive recorder, and an automatic driving system.

What is claimed is:

1. A spectrometry method used by a spectrometry apparatus including
    a spectrometry section including a spectrometer that spectrally separates reflected light reflected off an imaging target to select light having a predetermined wavelength and an imaging device that captures spectroscopic images based on light fluxes having a plurality of wavelengths selected by the spectrometer,
    a spectroscopic controller that controls an action of the spectrometer, and
    an image generator that generates the spectroscopic image,
    the method comprising:
    a spectroscopic image generation step of generating the spectroscopic image;
    a range division step of dividing a range of the spectroscopic image into a plurality of regions including at least a first region;
    a reference value determination step of determining a reference value of a color value;
    a region spectrum generation step of generating a first region spectrum based on the spectroscopic image of the first region;
    a tristimulus value calculation step of calculating first region tristimulus values based on the first region spectrum;
    a color value calculation step of calculating a first region color value based on the first region tristimulus values; and
    a color difference calculation step of calculating a first region color difference that is a color difference between the first region color value and the reference value by using a color difference formula.

2. The spectrometry method according to claim 1, further comprising a decision step of performing acceptable/unacceptable decision by comparing the first region color difference with a threshold.

3. The spectrometry method according to claim 1, wherein the first region color value and the reference value are color values in an L*a*b* color system.

4. The spectrometry method according to claim 1,
    wherein the reference value determination step includes
    a first reference value determination step of generating an overall spectrum across an overall range of a spectroscopic image,
    a second reference value determination step of calculating overall tristimulus values based on the overall spectrum, and
    a third reference value determination step of calculating an overall color value based on the overall tristimulus values and uses the overall color value as the reference value.

5. The spectrometry method according to claim 1, wherein the color difference calculation step is a step of selecting one of a plurality of the color difference formulae and calculating the first region color difference based on the selected color difference formula.

6. A spectrometry apparatus comprising:
    a spectrometry section including a spectrometer that spectrally separates reflected light reflected off an imaging target to select light having a predetermined wavelength and an imaging device that captures spectroscopic images based on light fluxes having a plurality of wavelengths selected by the spectrometer;
    a spectroscopic controller that controls an action of the spectrometer;
    an image generator that generates the spectroscopic image;
    a range divider that divides a range of the spectroscopic image into a plurality of regions including at least a first region;
    a reference value determiner that determines a reference value of a color value;
    a spectrum generator that generates a first region spectrum based on the spectroscopic image of the first region;
    a color value calculator that calculates first region tristimulus values based on the first region spectrum and calculates a first region color value based on the first region tristimulus values; and
    a color difference calculator that calculates a first region color difference that is a color difference between the first region color value and the reference value by using a color difference formula.

* * * * *